(12) United States Patent
Goossen et al.

(10) Patent No.: US 6,169,833 B1
(45) Date of Patent: Jan. 2, 2001

(54) CMOS-COMPATIBLE OPTICAL BENCH

(75) Inventors: Keith Wayne Goossen, Aberdeen; Ashok V. Krishnamoorthy, Middletown, both of NJ (US)

(73) Assignee: Lucent Technologies Inc., Murray Hill, NJ (US)

( * ) Notice: Under 35 U.S.C. 154(b), the term of this patent shall be extended for 0 days.

(21) Appl. No.: 09/235,624

(22) Filed: Jan. 22, 1999

(51) Int. Cl.$^7$ ........................................ G02B 6/30
(52) U.S. Cl. ........................ 385/49; 385/14; 385/50; 385/52; 385/88
(58) Field of Search ........................ 385/49, 14, 50, 385/52, 88–94, 65, 83

(56) References Cited

U.S. PATENT DOCUMENTS

| | | | |
|---|---|---|---|
| 4,675,717 | 6/1987 | Herrero et al. | 357/71 |
| 4,779,946 | 10/1988 | Pimpinella et al. | 350/96.2 |
| 5,703,973 | 12/1997 | Mettler et al. | 385/14 |
| 5,909,523 | * 6/1999 | Sakaino et al. | 385/49 |
| 5,972,232 | * 10/1999 | Lee et al. | 385/14 X |
| 6,058,234 | * 5/2000 | Tachigori | 385/49 |

* cited by examiner

Primary Examiner—Phan T. H. Palmer
(74) Attorney, Agent, or Firm—J. J. Brosemer

(57) ABSTRACT

A method of aligning, placing, and attaching an optical fiber directly to an electronic, complementary, metal-oxide-semiconductor (CMOS) chip that uses alignment features defined during the CMOS fabrication. The method involves the steps of: i) defining, during the fabrication of an electronic CMOS device, one or more shallow grooves upon the device substrate; ii) disposing an optical fiber within the defined groove(s); and iii) securing the optical fiber within the groove(s). Advantageously, the method may be practiced using a variety of fabrication techniques and apparatus that are compatible with conventional CMOS devices.

9 Claims, 9 Drawing Sheets

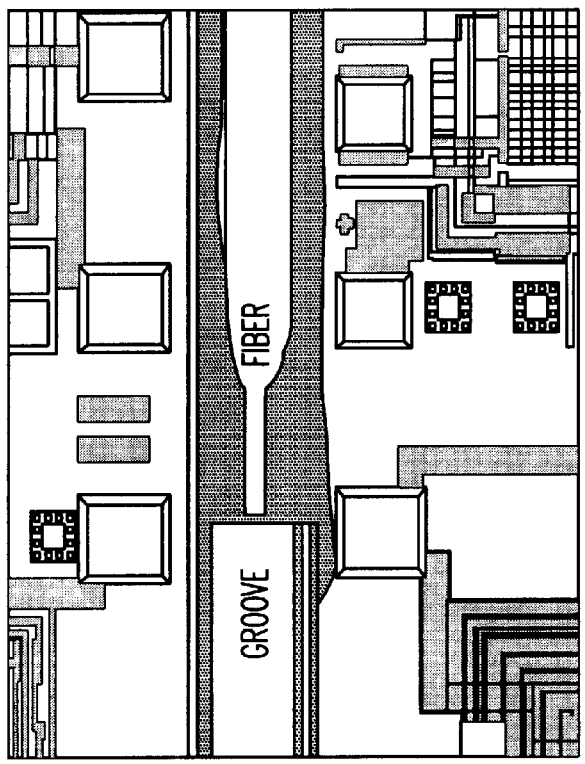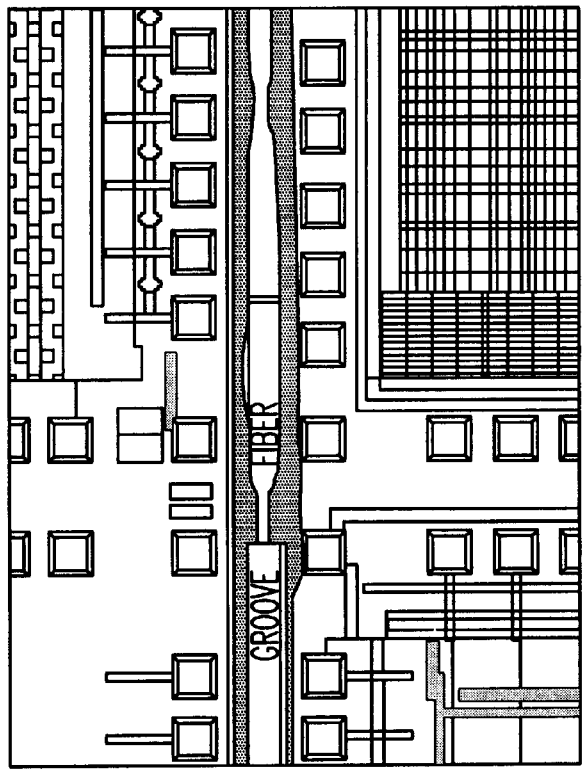
FIGURES 2b & 2c: MICROPHOTOGRAPHS OF CMOS WAFER WITH STANDARD 125 μm OUTER DIAMETER (CLADDING) FIBER EPOXIED IN PLACE.

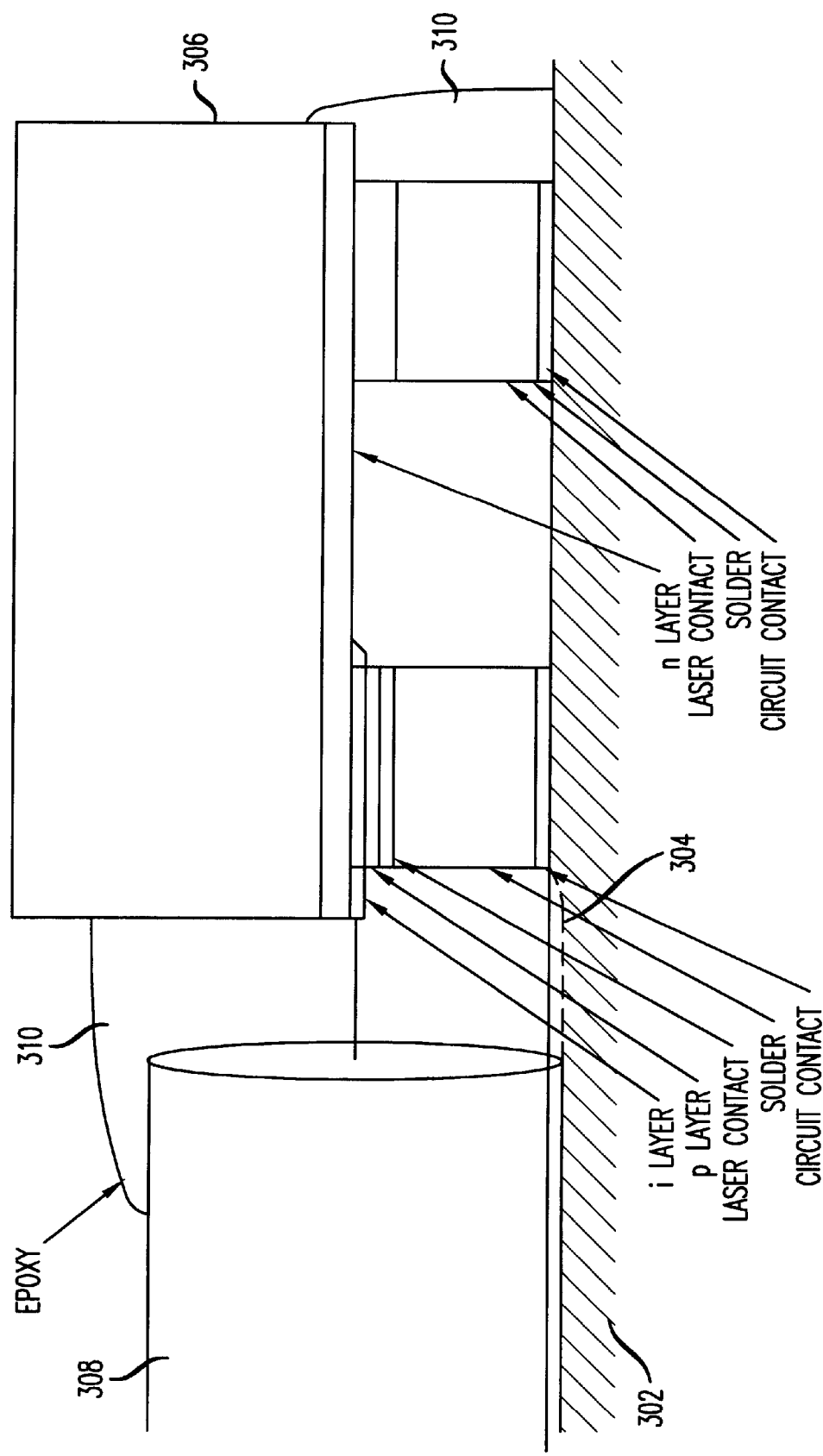

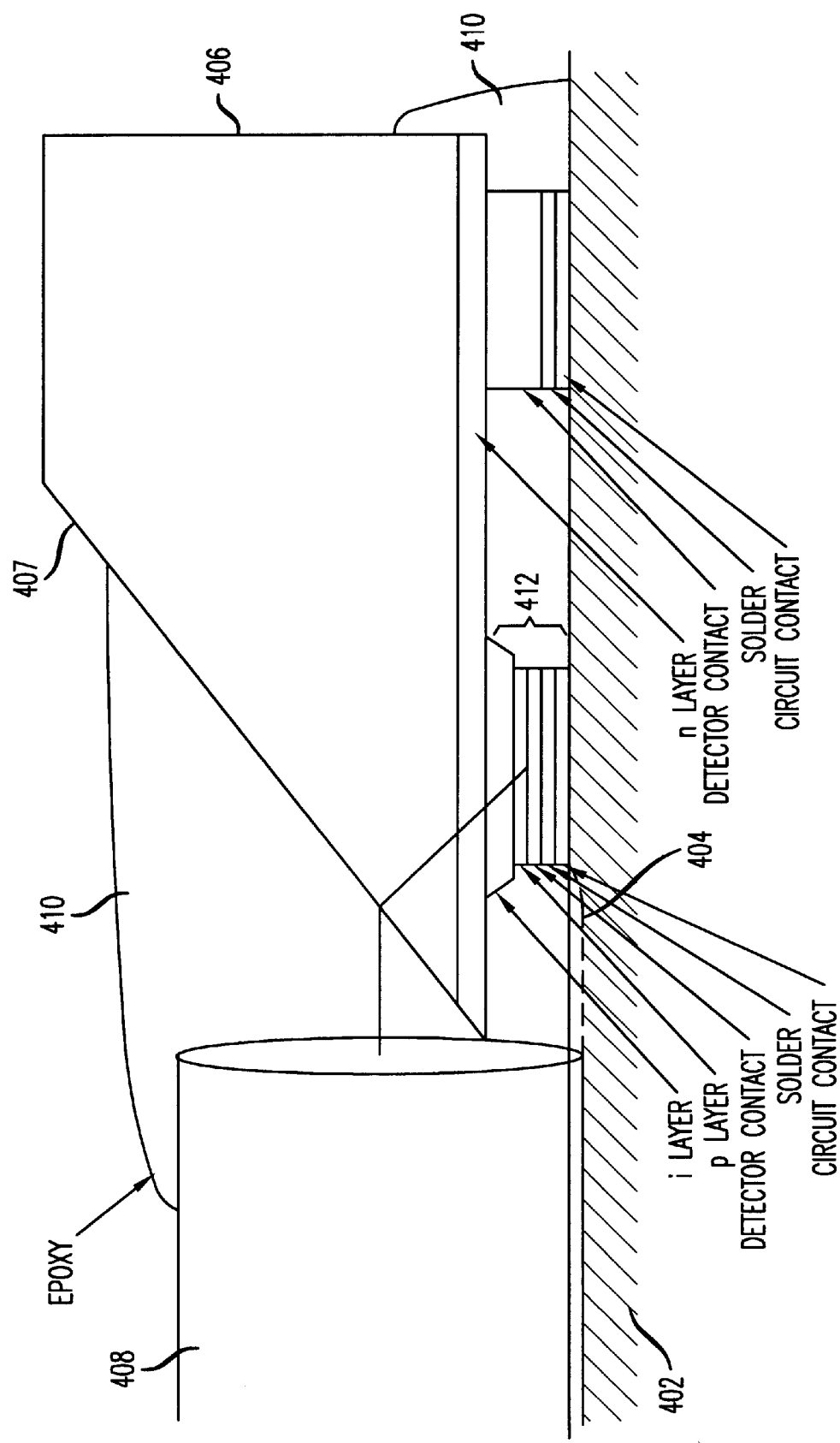

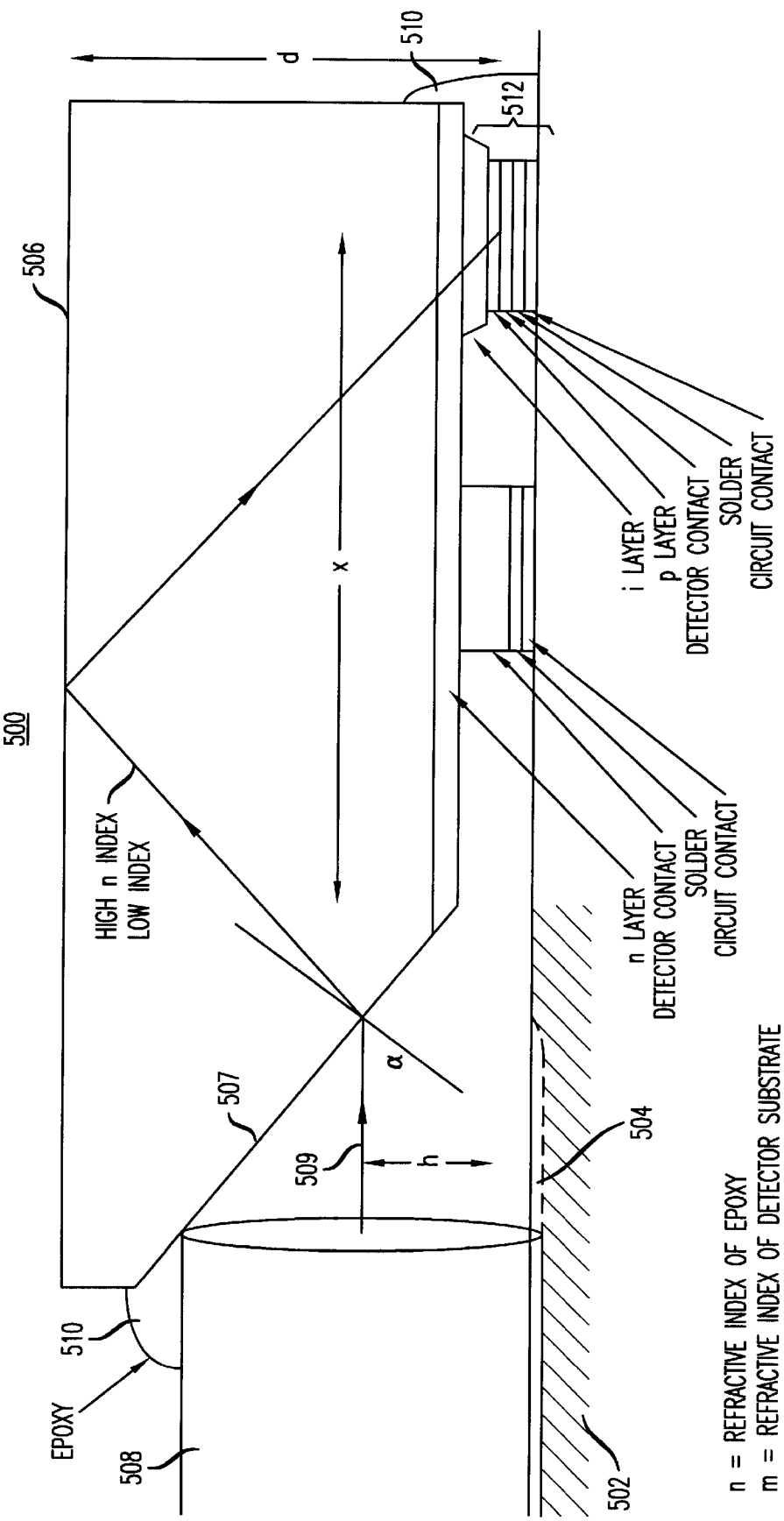

CMOS DESIGN HIERARCHY FOR A TYPICAL 3-LEVEL METAL PROCESS

```
OverGlass      XXXXXXXXXXXXXXXXXXXXXXXXXXXXXXXXXXXX
M3      XXXX                                          XXXX
Via2    X                                             X
M2      XXXXX                                         XXXXX
Via1      X                                             X
M1      XXXXXX                                        XXXXXX
Contact   X                                             X
P-Island XXXXXXX                                      XXXXXXX
N-Island     XXXXXXXXXXXXXXXXXXXXXXXXXXXXXXXXXXXX
N-Well       XXXXXXXXXXXXXXXXXXXXXXXXXXXXXXXXXXXX
```

DESIGN OF THE CMOS SHALLOW GROOVE

CMOS-COMPATIBLE OPTICAL BENCH

FIELD OF THE INVENTION

The present invention relates generally to the field of optical communications and in particular to a complementary metal-oxide-semiconductor (CMOS) electronic chip having an optical fiber directly attached thereto and a method of preparing same.

BACKGROUND OF THE INVENTION

Optical fiber is increasingly used in a variety of applications ranging from long distance voice and data transmission to interconnection of electronic devices, subassemblies, or assemblies. In many applications of optical fiber, it is necessary to couple the optical fiber to an optoelectronic device.

The desirability of providing efficient and compact means for optically coupling an optoelectronic device to an optical fiber has become recognized. Desirably, such means are compatible with integrated circuit (IC) fabrication and mounting technology since such compatibility may simplify assembly and therefore result in significant cost reduction. For an example of an advanced mounting technique see, for instance, U.S. Pat. No. 4,675,717, incorporated herein by reference.

Another fiber-to-device coupling assembly that is compatible with IC fabrication technology is disclosed in U.S. Pat. No. 4,779,946, filed Feb. 14, 1986 for R. J. Pimpinessa and J. M. Segelken and incorporated herein by reference. This prior art assembly utilizes a Si chip comprising a through-aperture to maintain the end of an optical fiber in coupling relationship with an optoelectronic component mounted on the chip. The chip exemplary is produced by a process that comprises selective etching of one face of a Si wafer to form sloped-wall through-apertures, formation of metallization patterns on the other face of the wafer in precise alignment with respect to these apertures, and dicing of the wafer. The end of an optical fiber is inserted into the aperture and maintained therein by appropriate means, and an appropriate optoelectronic device, i.e., transducer, is aligned with the metallization pattern and conductively attached thereto.

Alignment between the core of the optical fiber and the active area of the transducer results from the precise placement of the metallization pattern and the alignment of the transducer with the pattern. The thus formed assembly can then be mounted on an appropriate substrate (e.g., a Si wafer with appropriate metallization thereon) substantially in the same manner as ordinary IC chips, e.g., by means of a face-down solder ball technique.

Finally, an optical integrated circuit having passively aligned fibers was disclosed in U.S. Pat. No. 5,703,973 that issued to Mettler et al. on Dec. 30, 1998 is incorporated herein by reference. As disclosed therein, an optical integrated circuit and an optical array are joined using index matching material and mounted on a planar bridging structure to form a device that can be connected to other devices using optical connectors. The optical integrated circuit and the fiber array include multiple silicon substrates having bottom surfaces that have reference areas and top sides that have a plurality of optical paths. These optical paths are positioned above each reference area and bottom sides of the optical integrated circuit and the fiber array include alignment features that are etched into their substrates and bear a predetermined horizontal relation to the optical paths. Consequently, when the optical integrated circuit and the fiber array are positioned upon an additional substrate that mates with the alignment features of the optical integrated circuit and the fiber array, the resulting overall device is in proper, optical alignment.

Although providing a significant advance over other prior art assemblies, the above-described assembly has some shortcomings. In particular, the assembly requires several individual parts, i.e, the fiber array, the optical integrated circuit and the underlying substrate, that must be mechanically aligned and assembled into a unitary structure. Additionally, the prior art has focussed on attaching an optical fiber to an optoelectronic device, not an electronic device. In view of this, it will be apparent that simple structures and methods for coupling optical fibers to electronic integrated circuits as well as devices so constructed are highly desirable. We disclose herein such a method and device.

SUMMARY OF THE INVENTION

We have developed a method of aligning, placing, and attaching an optical fiber directly to an electronic chip (i.e., complementary, metal-oxide-semiconductor (CMOS)) chip that uses alignment features defined during the CMOS fabrication. Specifically, the method involves the steps of: i) defining, during the fabrication of an electronic CMOS device, one or more shallow grooves upon the electronic device substrate; ii) disposing an optical fiber within the defined groove(s); and iii) securing the optical fiber within the groove(s). Advantageously, the method may be practiced using a variety of fabrication techniques and apparatus that are compatible with conventional CMOS devices. A distinguishing characteristic of our inventive method and apparatus, is that while the prior art has shown how to attach an optical fiber to an optical device, we have shown how to attach an optical fiber to an electronic device using electronic fabrication techniques.

Further features and advantages of the present invention, as well as the structure and operation of various embodiments of the present invention are described in detail below with reference to the accompanying drawing.

BRIEF DESCRIPTION OF THE DRAWING

FIG. 2(b) is a microphotograph of a CMOS wafer with a 125 μm optical fiber bonded thereto according to the invention;

FIG. 2(c) is a close-up microphotograph of the CMOS wafer of FIG. 2(b);

FIG. 3 is a schematic of an optical fiber optically coupled to a device according to the invention;

FIG. 4 is a schematic of an alternative configuration of an optical fiber optically coupled to a device according to the invention;

FIG. 5 is a schematic of another alternative configuration of an optical fiber optically coupled to a device according to the invention;

DETAILED DESCRIPTION OF THE INVENTION

Figure 2A:
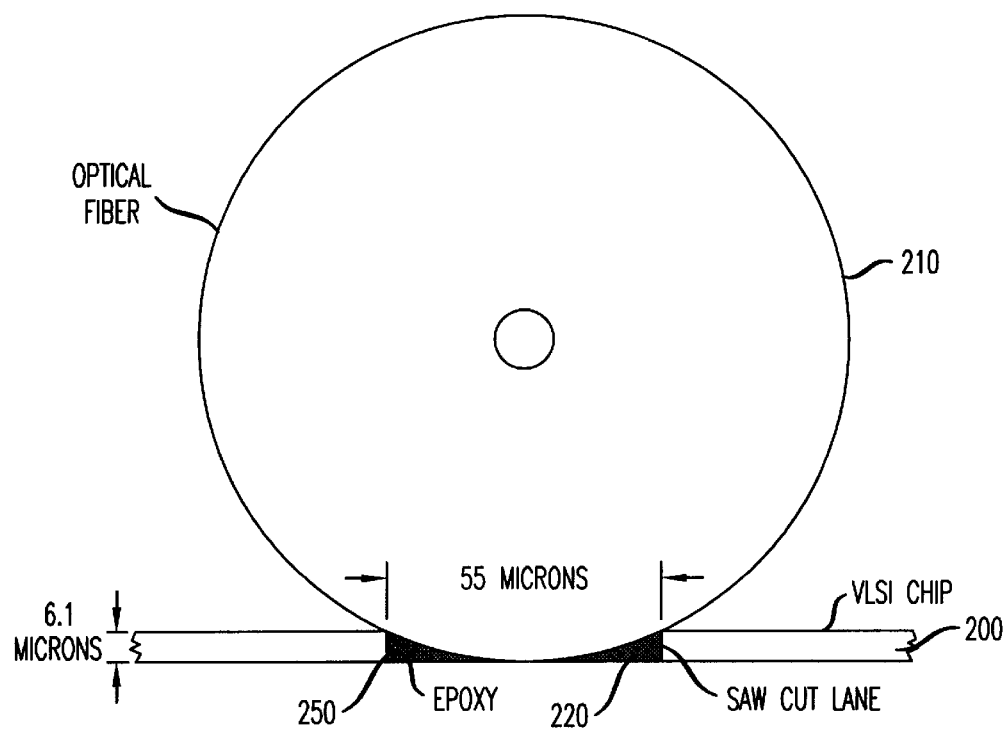
FIG. 2(a) is a schematic, cross-sectional view of a VLSI chip having a shallow groove holding a 125 μm optical fiber according to the invention.

FIG. 2(*a*) illustrates the basic principle of our invention. Specifically, a VLSI chip 200 as shown schematically in cross section in FIG. 2(*a*), may advantageously comprise Si, although other materials (e.g., Ge, ceramics) could also be used. Among the advantages of Si is the ease and economy with which such bodies can be produced to very close tolerances, due to the existence of highly developed processing techniques that include photolithography and preferential etching. These techniques are well known and therefore do not need detailed review.

Shown further in FIG. 2(*a*), a 125 $\mu$m optical fiber 210, is positioned within a shallow groove 220 formed within VLSI chip 200. Groove 220, may be a "saw cut lane", created during the processing of chip 200 and used for separating individual chips that may, for example, be processed on a single wafer. Advantageously, groove 220 may be relatively shallow. As an example, groove 220 shown in FIG. 2(*a*) is approximately 6 microns deep.

Once the fiber 210 is positioned within the groove 220, a suitable adhesive such as an epoxy-type adhesive 230, may be wicked into the groove 220 where it is subsequently allowed to cure, thereby adhering the optical fiber 210 into the groove 220. Of course, those skilled in the art will appreciate that many types and formulations of adhesives for securing an optical fiber within the groove are contemplated and within the scope of our invention.

Figure 1:
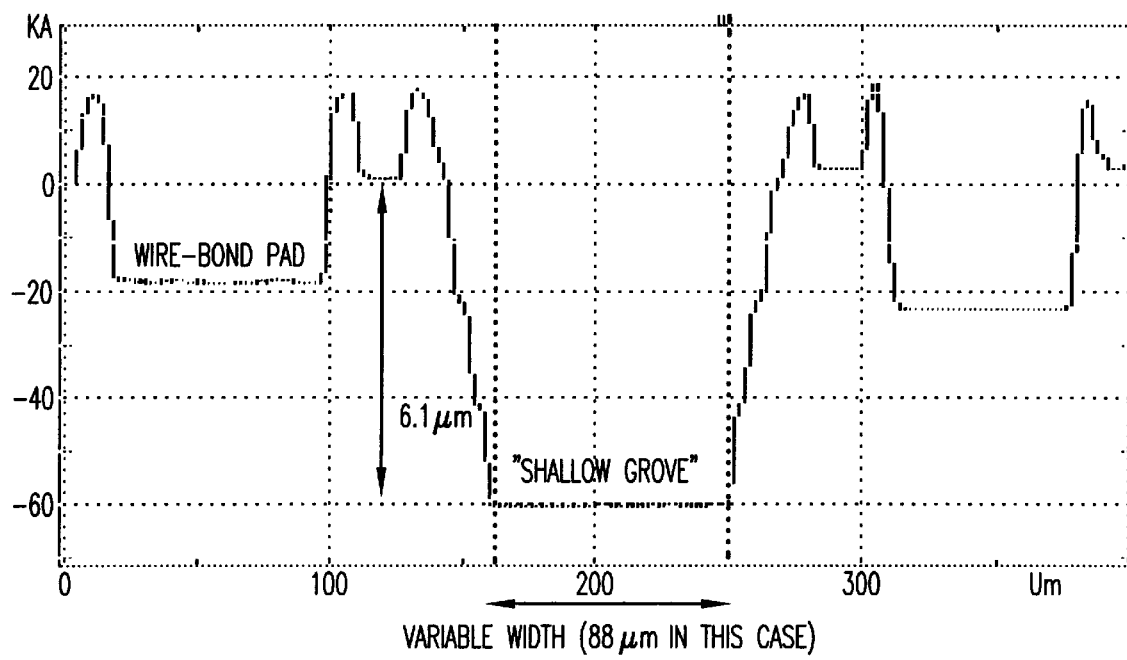
FIG. 1 is a plot of surface profile for a fabricated CMOS wafer according to the invention showing a 6.1 μm deep "shallow groove"

With reference to FIG. 1, there is shown a surface profile for CMOS chip constructed according to our teachings with a 6.1 $\mu$m shallow groove. By way of comparison, shown further in this figure is a wire bond pad region, approximately 2 $\mu$m deep. Although the width of the shallow groove shown in the figure is relatively narrow, i.e., only 88 $\mu$m, we have found that such a narrow, shallow groove is sufficient for aligning and securing the optical fiber to the CMOS chip. Furthermore, such a narrow groove permits the precise alignment of the optical fiber with on-chip optoelectronic devices such as phototransmitters or photoreceivers. Consequently, and as can be readily appreciated by those skilled in the art, our inventive method and apparatus permits direct, precise, on-chip coupling of optical fibers to optoelectronic-VLSI circuits fabricated on the chip.

Turning now to FIG. 3, there is shown an optoelectronic package 300 constructed according to the teachings of the present invention. Specifically, substrate 302 having a shallow groove 304 has attached thereto an optoelectronic device 306 which, in this example is "flip-chip" bonded to the substrate. Optoelectronic devices and "flip-chip" techniques are well-known, and their review here is not necessary.

Additionally, it is to be understood that our particular embodiments shown include optoelectronic circuits, they could include electronic circuits formed within the substrate. Such techniques for forming electronic circuits within a substrate using conventional i.e., CMOS techniques and technologies are well known and need not be reviewed here.

Shown further, optical fiber 308 is disposed in the shallow groove 304 and is affixed in position in a suitable optical alignment with the optoelectronic device 306 by a suitable adhesive 310, such as an epoxy-type adhesive. While we specifically discuss the use of an epoxy-type adhesive, our invention is not so specifically limited. In particular, any adhesive that fixes the substrate 302, the optical fiber 308, and the optoelectronic device 306 in suitable optical alignment relative to one another and that exhibits appropriate mechanical, and chemical stability, will suffice for the purposes of our invention.

Turning now to FIG. 4, there is shown an alternative configuration of our present invention. Shown therein, optical fiber 408 is bonded to a substrate 402 along with an optoelectronic device 406 according to the present invention. Advantageously, a face 407 of the circuit 406 package may be etched to a desirable angle. As such, when the optical fiber 408 is "butted" up against the angled face 407, light emanating from the optical fiber 408 strikes a desirable portion of optoelectronic device 406 such as a detector portion, 412. As with the prior configuration shown in FIG. 3, the optical fiber 408 is disposed within a shallow groove 404 made within the substrate 402, which aligns it with the optoelectronic device 406 and the substrate 402. These components are fixed in position by an adhesive such as an epoxy-type 410.

Another alternative configuration of our invention is shown in FIG. 5. Specifically, optical fiber 508 is bonded to a substrate 502 along with an optoelectronic device 506. In this alternative configuration, a face 507 of the optoelectronic device is etched or cut appropriately such that light 509 emanating from the optical fiber 508 will strike a desirable portion of the optoelectronic device 506 such as a detector portion 512. As with the prior embodiments, and according to our invention, the optical fiber 508 is disposed within a shallow groove 504 formed within the substrate 502. However, when the face 507 of the optoelectronic device 506 is cut or etched "down" such as shown in this Figure, then when the optical fiber 508 is butted against the cut face 507 of the optoelectronic device 506, the cut face 507 provides additional support of the alignment by "urging" the optical fiber 508 into shallow groove 504. When the fiber 508, is finally affixed by epoxy 510, a very stable, robust, and precisely aligned configuration is produced.

Figures 6, 8:
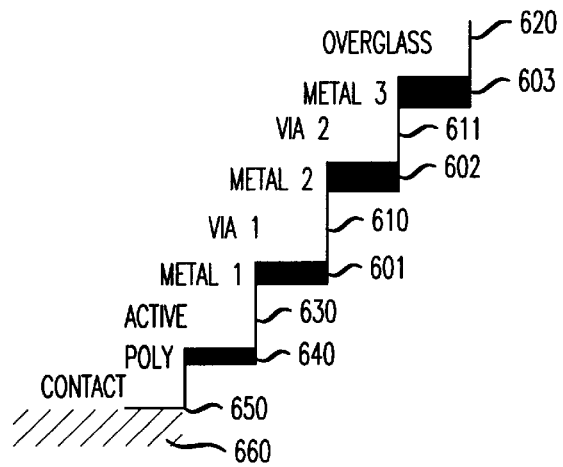
FIG. 6 is a schematic of a CMOS design hierarchy for a 3-level metal process.
FIG. 8 is a cross section schematic of a shallow groove according to the present invention having a number of "seal rings"

FIG. 6 shows a cross sectional schematic of a typical CMOS process (not to scale) showing those levels relevant to surface topography of a chip. As shown in this Figure, there are a number of metal levels (601, 602, 603), each of which is shown having a different metal thickness, i.e., 0.1–0.3 $\mu$m. As shown further, the topmost level metals (603, 602) may be thicker than the lower metal levels. In between the metal layers are insulating dielectric layers, approximately 1 $\mu$m thick. Connections between metal layers are made through VIA layers (610, 611). A topmost thick dielectric (the Overglass layer) 620 may be removed to permit contact with the upper-most metal 603.

Beneath the Metal 1 layer 601 shown in the Figure, is typically, a thick field-oxide. An active layer 630 defines cuts in the field-oxide, where only a thin layer of gate-oxide (approximately 4–10 nm, depending upon the technology utilized) remains. Transistors (not shown) may be defined where a Polysilicon gate (known as Poly, 640) overlaps the active layer 630. Contacts to a silicon wafer 660 may be made through a thin oxide by defining a contact layer 650.

While each of these layers may exhibit a slightly different thickness due to process technology variations, nevertheless, by appropriately stacking metal lines and VIA openings using layers such as those described above, a shallow groove approximately 6–7 μm may be designed. Importantly, even deeper grooves can be made as appropriate.

Figure 7:
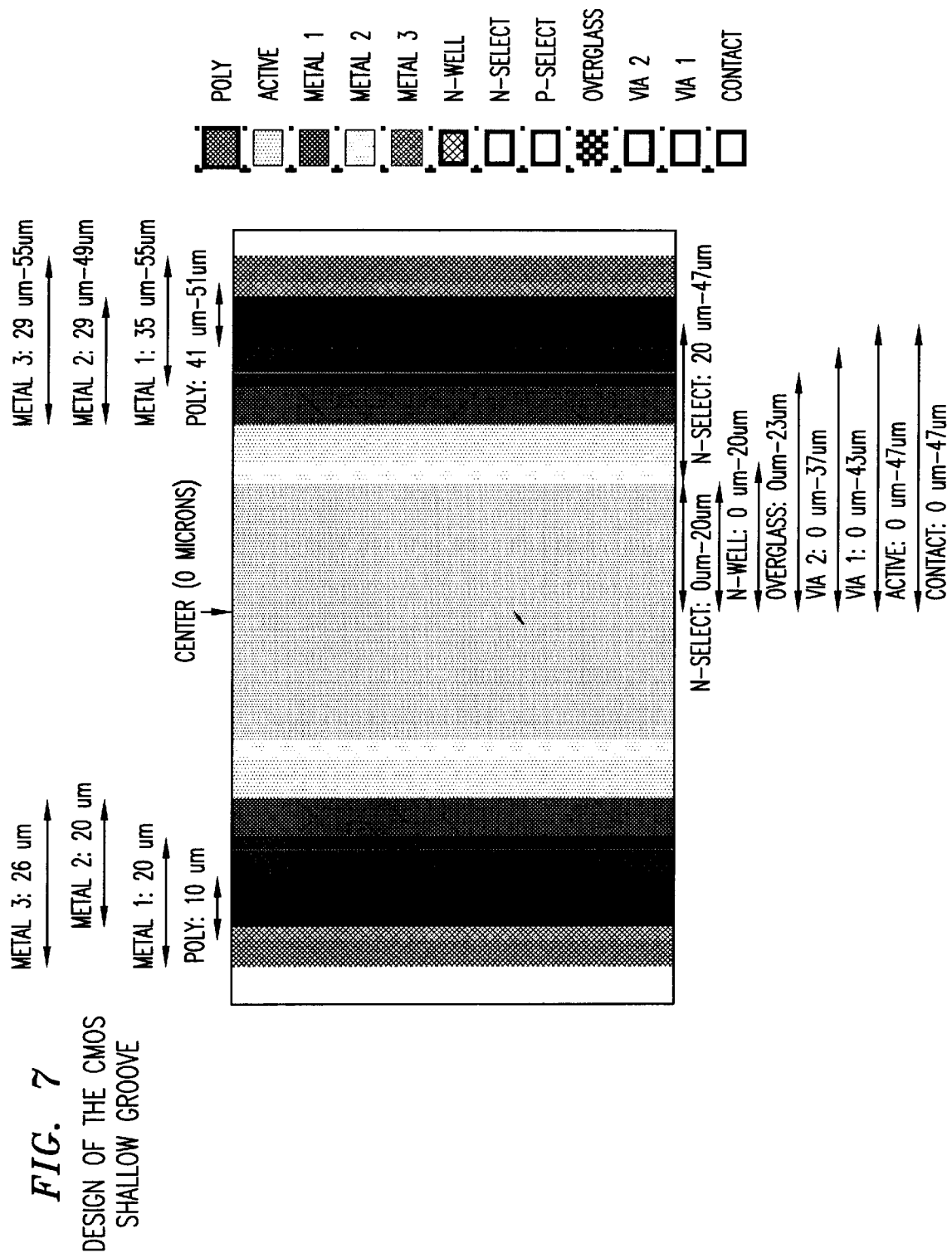
FIG. 7 is a schematic for a basic design for a shallow groove layout-geometry and various layers as it would be drawn in a CMOS design file.

With reference now to FIG. 7, there is shown a basic design for a shallow groove layout-geometry and various layers as it would be drawn in a CMOS design file. A basic tenet of the shallow-groove methodology which is the subject of the present invention is to stack the VIA-layers in a central dip of the groove and stack metal layers and inter-metal dielectrics (i.e., no contracts between metal layers) in higher surrounding regions to create an effective, shallow groove in a Silicon wafer.

The arrangement of the metal layers and the inter-metal dielectric layers is configured to provide a surface-profile that has relatively steep, sloping side walls. This is generally preferred to a series of stepped "mesas", which may make the placement of a fiber in the groove less precise. With reference to FIG. 7., the particular dimensions shown therein, are shown only as an example of how the shallow groove, would be designed using a process having 3 levels of metal. For processes with more than 3 metal levels, the VIA 3 (and higher openings) would be placed in a central region, and higher levels of metal would be stacked on the sides. Note that the shallow groove is substantially symmetric about the center. Also, the groove can be widened or narrowed by extending or reducing the width of layers in the central region (0 μm to ±20 μm).

It may be noted at this time that the particular geometry shown in FIG. 7 assumes that VIA layers can be vertically stacked (i.e., VIA 2 opening can be designed directly above a VIA 1 opening). This assumption is valid in certain CMOS technologies and care must be taken not to make gross violations of the CMOS design rules specific of the particular technology. Without this ability to stack VIA layers, the VIA 1 and VIA 2 openings would be removed, and glasscut opening would be extended to the end of active layer, i.e, 470 μm. In such a situation, the depth of the shallow groove may be significantly reduced, unless a larger number of metal layers are provided.

We may contrast this shallow-groove to a saw-cut or scribe lane used to separate chip-designs and provide a lane where a saw may subsequently be used to cut the chips apart. With reference to FIG. 8, a scribe lane is shown approximately 90 μm wide. In the scribe lane, n-well, n-island and overglass layers are shown full-width. On either side of the scribe lane is a "seal ring" that is a stack of metals over the p-island, extending up to the scribe, metal 1 and stepped back 1 μm, with the additional metals stepped back an additional 2 μm each. The metal sack is contacted to the p-island through a ring of contacts.

Figure 9:
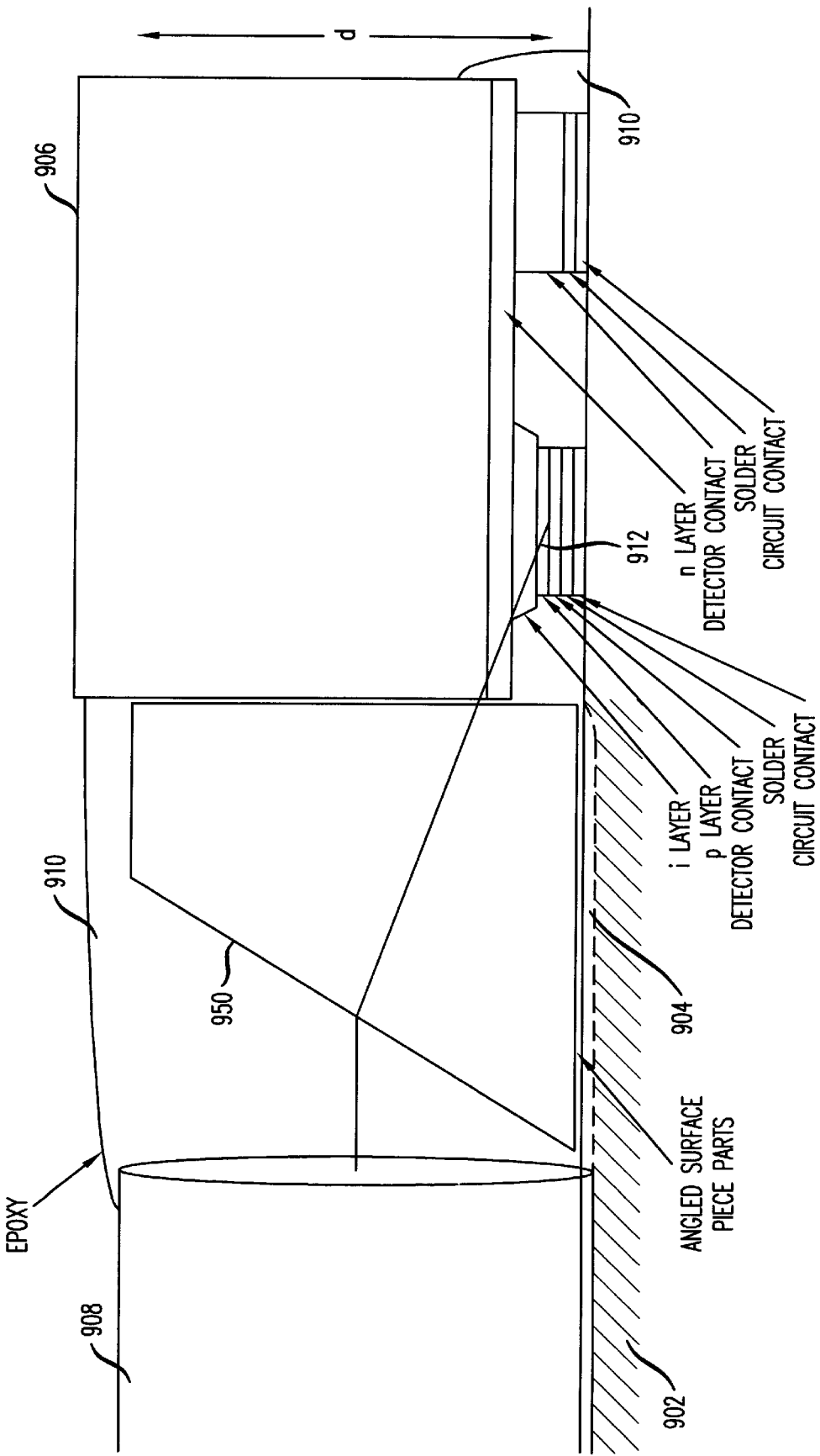
FIG. 9 is a schematic of an additional alternative configuration of an optical fiber optically coupled to a device according to the invention.

Turning now to FIG. 9, yet another alternative embodiment of our present invention is shown. Specifically, optical fiber 908 is bonded to a substrate 902 according to the present invention. Additionally, a passive optical device 950, such as a prism, mirror, or lens, etc., is positioned between the optical fiber 908 and the optoelectronic device 906. As such, when the optical fiber 908 is in suitable optical alignment with the passive optical device 950, light emanating from the optical fiber 908 strikes a desirable portion of the optoelectronic device 906 such as a detector portion, 912. As with the ether configurations shown previously, the optical fiber 908 is disposed within a shallow groove 904 made within the substrate 902 such that it is in a suitable alignment with the optoelectronic device 906 and the substrate 902. These components are fixed in position by an adhesive such as an epoxy-type 910.

Figure 10:
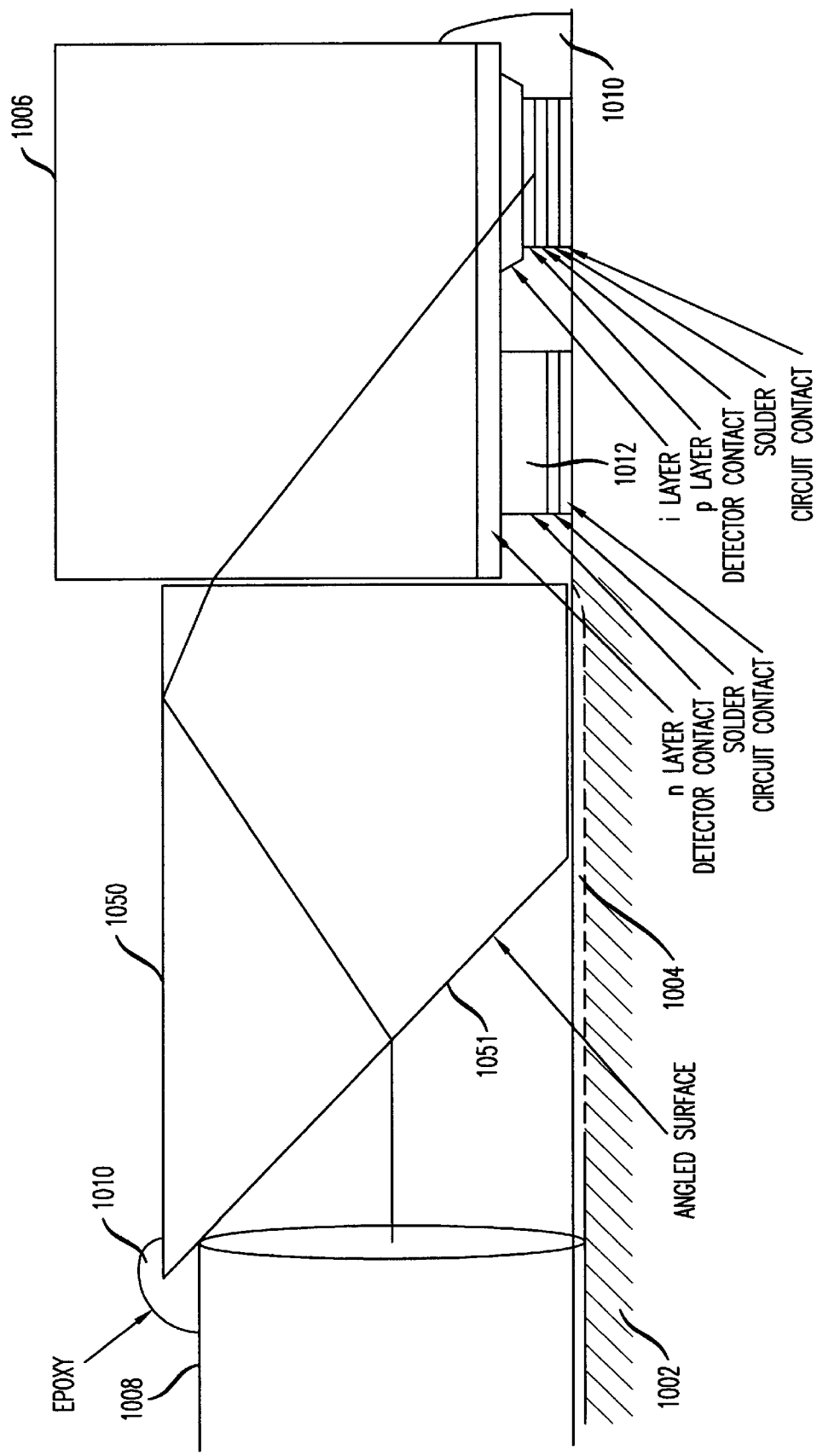
FIG. 10 is a schematic of a final alternative configuration of an optical fiber optically coupled to a device according to the invention.

Finally, with reference to FIG. 10, there is shown yet another alternative configuration of the present invention.

The configuration is similar to that of FIG. 9, with the exception that a passive optical device 1050, has an angled surface 1051 shown adjacent to the optical fiber 1008. In this inventive manner, when the optical fiber 1008 is positioned adjacent to the angled surface 1051 of the passive optical device 1050, the optical fiber 1008 is urged into a shallow groove 1004 cut into substrate 1002, during fabrication. Once permanently secured with an adhesive 1010, the optical fiber 1008, passive optical device 1050, substrate 1002 and optoelectronic device 1006, remain in a precise, desirable optical alignment.

While not explicitly shown in the figures, it is to be understood that the passive optical device 1050, or 950 (FIG. 9), may in fact be formed within the electronic integrated circuit itself. For example, it is well within the intention of the invention that a passive optical device may be defined during fabrication. Such a device may include, i.e., a waveguide formed within a shallow groove formed during the electronic circuit definition.

Various additional modifications of this invention will occur to those skilled in the art. In particular, alternative methods for forming the shallow grooves, alternative adhesives, optoelectronic circuits and alternative optical fiber compositions are contemplated. Nevertheless, all deviations from the specific teachings of this specification that basically rely upon the principles and their equivalents through which the art has been advanced are properly considered within the scope of the invention as described and claimed.

The invention claimed is:

1. An optoelectronic device comprising:
    a substrate including
        an electronic integrated circuit formed thereon;
        a groove, formed within the substrate during the fabrication of the electronic integrated circuit; and
        an optical fiber disposed within the groove and affixed to the substrate.

2. The optoelectronic device according to claim 1 further comprising:
    a passive optical device defined in the substrate and in optical alignment with the optical fiber.

3. The optoelectronic device according to claim 2 further comprising:
    an adhesive which secures the optical fiber to the groove formed in the substrate.

4. The optoelectronic device according to claim 3 wherein the passive optical device is a prism.

5. A method of connecting an optical fiber to an electronic integrated circuit formed upon a substrate, the method comprising:
    forming, during the fabrication of the electronic integrated circuit, a receiving groove in the substrate such that the receiving groove is in a desirable alignment relative to the electronic integrated circuit;
    disposing the optical fiber within the groove;
    securing the optical fiber within the groove.

6. The method according to claim 5 wherein said securing step includes the step of:
    flowing an adhesive into the groove.

7. The method according to claim 6 wherein said groove is at least 6 μm deep.

8. The method according to claim 5 further including the step of:
    defining a passive optical device in the substrate.

9. The method according to claim 8 wherein said passive optical device is a prism.

* * * * *